United States Patent
Fujita

[19]

[11] Patent Number: 5,914,077
[45] Date of Patent: Jun. 22, 1999

[54] METHOD FOR SETTING UP A PROGRAM PROFILE IN THE CONTROL OF THE INJECTION SPEED OF INJECTION MOLDING MACHINES

[75] Inventor: Shigeru Fujita, Shizuoka, Japan

[73] Assignee: Toshiba Machine Co., Ltd., Tokyo, Japan

[21] Appl. No.: 08/622,450

[22] Filed: Mar. 22, 1996

[30] Foreign Application Priority Data

Mar. 24, 1995  [JP]  Japan .................................. 7-65949

[51] Int. Cl.$^6$ .................................................. B29C 45/77
[52] U.S. Cl. .................. 264/40.1; 264/40.7; 364/475.05; 425/145
[58] Field of Search ................... 264/40.1, 40.5, 264/40.7, 328.1, 328.7; 364/475.05; 425/145, 135, 159, 169

[56] References Cited

U.S. PATENT DOCUMENTS

| | | | |
|---|---|---|---|
| 5,005,116 | 4/1991 | Fujita et al. .......................... | 264/40.1 |
| 5,035,598 | 7/1991 | Fujita et al. .......................... | 264/40.7 |
| 5,296,179 | 3/1994 | Kamiguchi et al. ................... | 264/40.1 |
| 5,326,246 | 7/1994 | Usui et al. ............................. | 425/145 |
| 5,340,297 | 8/1994 | Takizawa et al. ..................... | 264/40.7 |
| 5,518,671 | 5/1996 | Takizawa et al. ..................... | 425/145 |
| 5,595,693 | 1/1997 | Fujita et al. .......................... | 264/40.1 |
| 5,611,975 | 3/1997 | Kamiguchi et al. ................... | 425/145 |

*Primary Examiner*—Jill L. Heitbrink
*Attorney, Agent, or Firm*—Young & Thompson

[57] ABSTRACT

A method for setting up a program profile in the control of an injection speed of injection molding machines where a dwelling phase switching position Pc, a filling stroke L or an injection starting point Ps, a maximum speed ratio Rvm and a initial speed ratio Rvs to the maximum speed mentioned in the specification of the molding machine, and an initial speed period ratio Rps to the filling stroke L or the injection starting position Ps are inputted to a profile setting means; in the profile setting means, the dwelling phase switching position Ps and the filling stroke L or the injection starting position Ps are directly set up according to the inputted values; and the maximum speed Vmax, the initial speed Vs and the initial speed period are set up by automatic computing using the maximum speed ratio Rvm and the initial speed ratio Rvs and the initial speed period ratio Rps as parameters; thereby all aspects of the profile are set up automatically.

2 Claims, 3 Drawing Sheets

FIG. 1
PRIOR ART
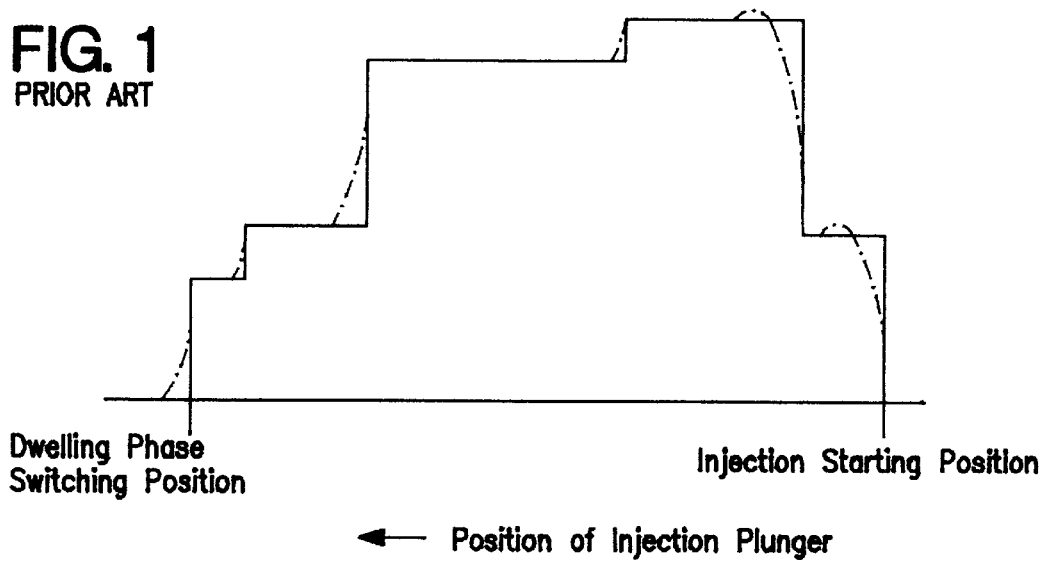
Dwelling Phase
Switching Position
Injection Starting Position
← Position of Injection Plunger
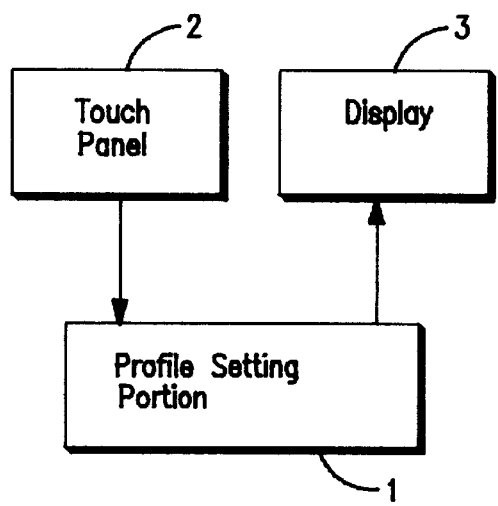
FIG. 2
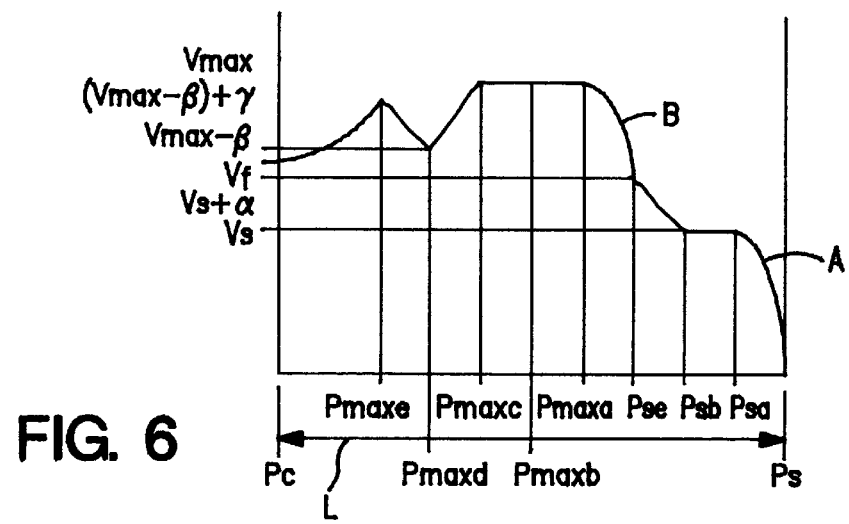
FIG. 6

METHOD FOR SETTING UP A PROGRAM PROFILE IN THE CONTROL OF THE INJECTION SPEED OF INJECTION MOLDING MACHINES

BACKGROUND OF THE INVENTION

1. Field of the Invention

The present invention relates to a method for setting-up a program profile in the control of the injection speed of injection molding machines and an apparatus therefor.

2. Related Art

In injection molding machines, the control of the moving speed of the injecting plunger (screw) in a forward direction is usually conducted in accordance with a program profile, which is preliminarily set up in a computer.

The profile is generally set up in the computer in such a manner that a filling stroke of the injection plunger is divided into a plurality of phases, and the moving speed of the plunger in a forward direction is directly designated at every phase of the stroke to obtain a multi-step rectangular-shaped profile.

FIG. 1 is a graph showing the thus obtained conventional program profile in the control of the moving speed of the injection plunger. As shown in FIG. 1, in the conventional profile, the filling stroke of the injection plunger is divided into five phases, and the moving speed of the plunger V1 to V5 is directly designated at every phase of the stroke to obtain the multi-step rectangular-shaped profile.

In this manner, according to the conventional technique for setting up a program profile in the control of an injection speed of injection molding machines, it is necessary to designate the moving speed of the plunger directly for every divided phase of the stroke of the plunger. However, in actual mold cavities, the cross-section of the course of the melt resin is suddenly changed, so that the conventional rectangular-shaped profile does not correspond to the actual movement of the melt resin as it flows through the mold cavity.

Therefore, according to the conventional technique, in order to obtain a profile which correspond to the actual shape of the course of the melted resin in the cavity, it is necessary to increase the number of the steps of the rectangular portions of the profile; accordingly, the number of the phase to be divided of the moving speed of the plunger should be increased.

Further, it is required to set up the program profile so as to complete to fill up the molding cavity with melt resin within a period as short as possible without disturbing the flowing condition of the melt resin in the mold cavity. Therefore, the program profile should be set up, by which the moving speed of the plunger is changed so as to comply with the actual shape of the course of the melt resin in the mold cavity.

Furthermore, in order to set up such a profile, the know-how on the basis of a molding principle is necessary to control the moving speed of the plunger when the melt resin starts to be injected into a cavity or when the filling up phase of the resin is finished.

Moreover, as shown in FIG. 1 by broken lines, the actual moving speed of the injection plunger in a forward direction has some delays from the profile on the leading and trailing edges thereof when the moving speed is changed. As apparent from FIG. 1, the actual moving speed of the injection plunger does not change according to the multi-step rectangular-shaped profile set up in the computer.

Therefore, the actual profile of the moving speed of he injection plunger (hereinafter referred to as "a prosecuting profile") does not correctly correspond to the program profile in the control of the injection speed (hereinafter referred to as "a set-up profile"), so that the prosecuting profile and the set-up profile are not the same when superimposed on each other when a closed loop control is conducted. In order to solve this drawback, a delay control is applied in which time constants are generated on the leading and trailing edges of the moving speed of the plunger. However, such delayed leading and trailing edges are not involved in the profile.

From these reasons, when a closed loop control is conducted, the prosecution profile is deviated from the set-up profile even if the control is conditioned normally; such a deviation causes difficulty in the control of the moving speed of the plunger.

On the other hand, another method for setting a program profile is suggested where the profile corresponds to the variation of the shape of the course of the melted resin in the mold cavity. According to the method, the profile is formed by broken lines being connected, however, it is difficult to set parameters unless the shape of the course of the melted resin in the mold cavity is well known, and it is required to have many points to be set up in order to obtain the profile which corresponds to the shape of the flowing path of the melted resin. Therefore, according to the method, it would be difficult to realize an idea that the required profile can be obtained with a small amount of inputting data. Further, the know-how for setting the parameters is much more difficult than that for setting a multiple rectangular-shaped profile.

SUMMARY OF THE INVENTION

The present invention has for its purpose to provide a method for setting a program profile in the control of the injecting speed of injection molding machines and an apparatus therefore, where a proper program profile for controlling the injecting speed can be easily and automatically obtained without using any know-how.

In order to carry out the purpose, a method for setting up a program profile in the control of the injecting speed of injection molding machines according to the present invention, in which a moving speed of an injection plunger in a forward direction is controlled by the program profile in accordance with a position of the plunger, has a first aspect in that a switching position of the injection plunger when an injection phase is changed from a melt material filling phase to a dwelling phase (hereinafter referred to as "a dwelling phase switching position of the injection plunger"), a filling stroke of said injection plunger during the injection phase or a position of the plunger when the injection phase starts (hereinafter referred to as "an injection starting position of the plunger"), a maximum speed of the profile, an initial speed of the profile, and a period during which said initial speed of the plunger is kept (hereinafter referred to as "an initial speed period"), are inputted into a profile setting means with the aid of a data inputting means, so that all aspects of the profile is automatically set up by said profile setting means.

Further, in order to solve the above-mentioned drawbacks, a method for setting up a program profile in the control of an injecting speed of injecting molding machines has a second aspect in that: the dwelling phase switching position of the injection plunger, the filling stroke of the injection plunger or the injection starting position of the plunger, a ratio of a maximum speed of the profile to a maximum speed mentioned in a specification of the molding machine (hereinafter referred to as "a maximum speed ratio", a ratio of an initial speed of the profile to the maximum speed mentioned in the specification of the molding machine (hereinafter referred to as "an initial speed ratio"), and a ratio of the initial speed period, during which the initial speed of the injection plunger is kept, to the filling stroke of the injection plunger or to the injection starting position of the plunger, are inputted into the profile setting means with the aid of the data inputting means, so that the dwelling stage switching position of the injection plunger and the filling stroke of the injection plunger or the injection starting position of the plunger are directly set up by the thus inputted value in the profile setting means, and said maximum speed of the profile, said initial speed of the profile and said initial speed period of the profile are set up by an automatic calculation using the inputted values, i.e. said the maximum speed ratio, said the initial speed ratio, and said the initial speed period ratio, as parameters; thereby all aspect of the profile are automatically set up by said profile setting means.

The method for setting a program profile in the control of an injection speed of injection molding machines according to the present invention has a third aspect that: the profile is set up in such a manner that the moving speed of the injection plunger in the forward direction is reduced from the maximum speed to an ending speed in accordance with a predetermined speed reduction characteristic so that the moving speed of the injection plunger becomes the predetermined ending speed thereof at the dwelling switching position.

The method for setting a program profile in the control of an injection speed of injection machines according to the present invention has a fourth aspect that: the moving speed of the injection plunger in the forward direction at said dwelling stage switching position is inputted into the profile setting means with the aid of said data inputting means, so that the thus inputted data is directly set up in the profile as a moving speed of the plunger in the forward direction at the dwelling stage switching position.

The method for setting a program profile in the control of an injecting speed of injection molding machines according to the present invention has a fifth aspect that: at least two values are preliminarily given in said profile setting means for each of the items to be set up in the profile, such as the dwelling stage switching position of the plunger, the filling stroke of the injection plunger or the injection starting position of the plunger, the maximum speed of the profile or the maximum speed ratio, the initial speed of the profile or the initial speed ratio, and the initial speed period of the profile or the initial speed period ratio; and one of the preliminarily given values is selected by means of the data inputting means for each item and set up in the profile.

The method for setting a program profile in the control of setting an injection speed of injection molding machines according to the present invention has a sixth aspect that: one of the preliminarily given values is set up as a default value for each item.

The method for setting a program profile in the control of setting an injection speed of injection molding machines according to the present invention has a seventh aspect that: the value set up by selecting one from said preliminarily given values can be arbitrarily changed by means of said data inputting means.

The method for setting a program profile in the control of setting an injection speed of injection molding machines according to the present invention has a eighth aspect that: at least two values are set up for at least one of the initial speed of the plunger and the maximum speed of the plunger.

The method for setting a program profile in the control of setting an injection speed of injection molding machines according to the present invention has a ninth aspect that: said values set up for at least one of said initial speed and said maximum speed are arranged in such a manner that a first value thereof is set up first and then values on and after the second are set up so as to be the same as the first value.

The method for setting a program profile in the control of setting an injection speed of injection molding machines according to the present invention has a tenth aspect that: said values on and after the second set up for at least one of the initial speed and the maximum speed of the plunger can be arbitrarily changed.

The method of setting a program profile in the control of setting an injection speed of injection molding machines according to the present invention has an eleventh aspect that: a responding speed characteristic(s) of at least one of the leading edge of the initial speed and the leading edge of the maximum speed is (are) determined by a preliminarily set up function(s).

The method for setting a program profile in the control of an injection speed of injection molding machines according to the present invention has a twelfth aspect that; at least two functions for determining said responding speed characteristic(s) are preliminarily given in the profile setting means, and the responding speed characteristic(s) is (are) selected therefrom with the aid of said data inputting means to be set up in the profile.

While, an apparatus for setting a profile in the control of an injection speed of injection molding machines according to the present invention has a thirteenth aspect that: the apparatus comprises a data inputting means for inputting a dwelling phase switching position of an injection plunger where an injection phase is changed from melt material filling phase to a dwelling phase, a filling stroke of said injection plunger or an injection starting position of the plunger at which the plunger exists when the injection starts, a maximum speed of the profile, and initial speed of the profile, and an initial period during which the initial speed of the plunger is kept; and a profile setting means for automatically setting up all aspects of the profile in accordance with the values inputted by said data inputting means.

An apparatus for setting a program profile in the control of an injection speed of injection molding machines according to the present invention has a fourteenth aspect in that: the apparatus comprises a data inputting means for inputting data of the dwelling phase switching position of the injection plunger where an injection phase is changed from a melt material filling phase to a dwelling phase, a filling stroke of said injection plunger or the injection starting position of the plunger, a ratio of the maximum speed of the profile to a maximum speed mentioned in a specification of a molding machine to be used, a ratio of an initial speed of the profile to the maximum speed cited on the specification of the molding machine, and a ratio of the initial speed period to the filling stroke of the plunger or to the injection starting position of the plunger; and a profile setting means for directly setting up the dwelling stage switching position of the plunger and the filling stroke of plunger or the injection starting position by using the values inputted by the inputting means, and for automatically setting up a maximum speed of the profile and an initial speed of the profile and an ending position of the initial speed period of the profile by automatic calculation using the input values of the maximum speed ratio and the initial speed ratio and the initial speed period ratio of the profile as parameters.

According to the first thirteenth aspects of the present invention, all of the profile can be automatically set up in the profile setting means by inputting the dwelling stage switching position of the injection plunger, the filling stroke of said injection plunger or an injection starting position of the plunger, the maximum speed of the profile, the initial speed of the profile and the initial speed period of the profile into the profile setting means with the aid of the data inputting means.

According to the second and fourteenth aspects of the present invention, by inputting the dwelling stage switching position of the injection plunger, the filling stroke of said injection plunger of the injection starting position of the plunger, the ratio or the maximum speed of the plunger to the maximum speed mentioned in the specification of the molding machine to be used ("the maximum speed ratio"), and the ratio of the initial speed to the maximum speed cited in the specification of the molding machine to be used ("the initial speed ratio"), the ratio of the initial speed period to the filling stroke of the plunger or to the injection starting position of the plunger into the profile setting means with the aid of the data inputting means the dwelling stage switching position of the plunger and the filling stroke of the plunger or the injection starting position of the plunger are directly set up in the profile setting means; and the maximum speed, the initial speed and the initial speed period of the profile can be set-up in the profile setting means by an automatic calculation using the input values of the maximum speed ratio, the initial speed ratio, and the initial speed period ratio as parameters; thereby all aspects of the profile can be automatically set up in the profile setting means.

According to the third aspect of the present invention, the maximum moving speed of the plunger in the forward direction is reduced to the predetermined ending speed in accordance with a predetermined speed reduction characteristic so that the moving speed of the plunger in the forward direction becomes the predetermined ending speed at the dwelling stage switching position.

According to the fourth aspect of the present invention, the moving speed of the plunger in a forward direction at the dwelling stage switching position is directly set-up into the profile setting means as the relevant value inputted with the aid of said data inputting means.

According to the fifth aspect of the present invention, the set-up values for each item, i.e. the dwelling stage switching position of the plunger, the filling stroke of the plunger or the injection starting position of the plunger, the maximum speed or the maximum speed ratio of the profile, the initial speed or the initial speed ratio of the profile, and the initial speed period or the initial speed period ratio of the profile, is selected from values, which are preliminarily given in the profile setting means for each item.

According to the sixth aspect of the present invention, one of the preliminarily given values for each item in the profile setting means is set up as a default value.

According to the seventh aspect of the present invention, the values, which are set up by selecting from the preliminarily given values for each item, can be arbitrarily changed with the aid of the data inputting means.

Accordingly to the eighth aspect of the present invention, at least one of the initial speed and the maximum speed of the profile comprise at least two set up values.

According to the ninth aspect of the present invention, said values for at least one of the initial speed and the maximum speed are set up in such a manner that a first value thereof is set-up in the profile setting means first and then values on and after the second are set up so as to be the same as the first value.

According to the tenth aspect of the present invention, the values on and after the second for at least one of the initial speed and the maximum speed can be arbitrarily changed.

According to the eleventh aspect of the present invention, the responding speed characteristic(s) of at least one of the leading edge of the initial speed and the leading edge of the maximum speed of the profile is determined by a preliminarily set-up function(s).

According to the twelfth aspect of the present invention, the function(s) for determining the responding characteristic(s) of the leading edge(s) is (are) selected from the functions, which are preliminarily given in the profile setting means.

BRIEF DESCRIPTION OF THE DRAWING

FIG. 1 is a graph depicting a program profile in the control of an injection speed of injection molding machines, which is set-up according to a conventional technique.

FIG. 2 is a block diagram showing an embodiment of the apparatus for setting a program profile in the control of the injection speed of injection molding machines according to the present invention.

FIG. 6 is a schematic view showing another example of the profile which is set up using the method of the present invention.

DESCRIPTION OF THE PREFERRED EMBODIMENTS

Preferred embodiments according to the present invention will be explained in detail below, referring to the attached drawings.

FIG. 2 is a block diagram showing the construction of an apparatus for setting up a program profile in the control of the injection speed of injection molding machines according to the present invention. The apparatus comprises a profile setting portion 1, a touch panel 2 (as a data inputting means), and a display 3, (such as a CRT or a liquid crystal display panel).

Figure 3:
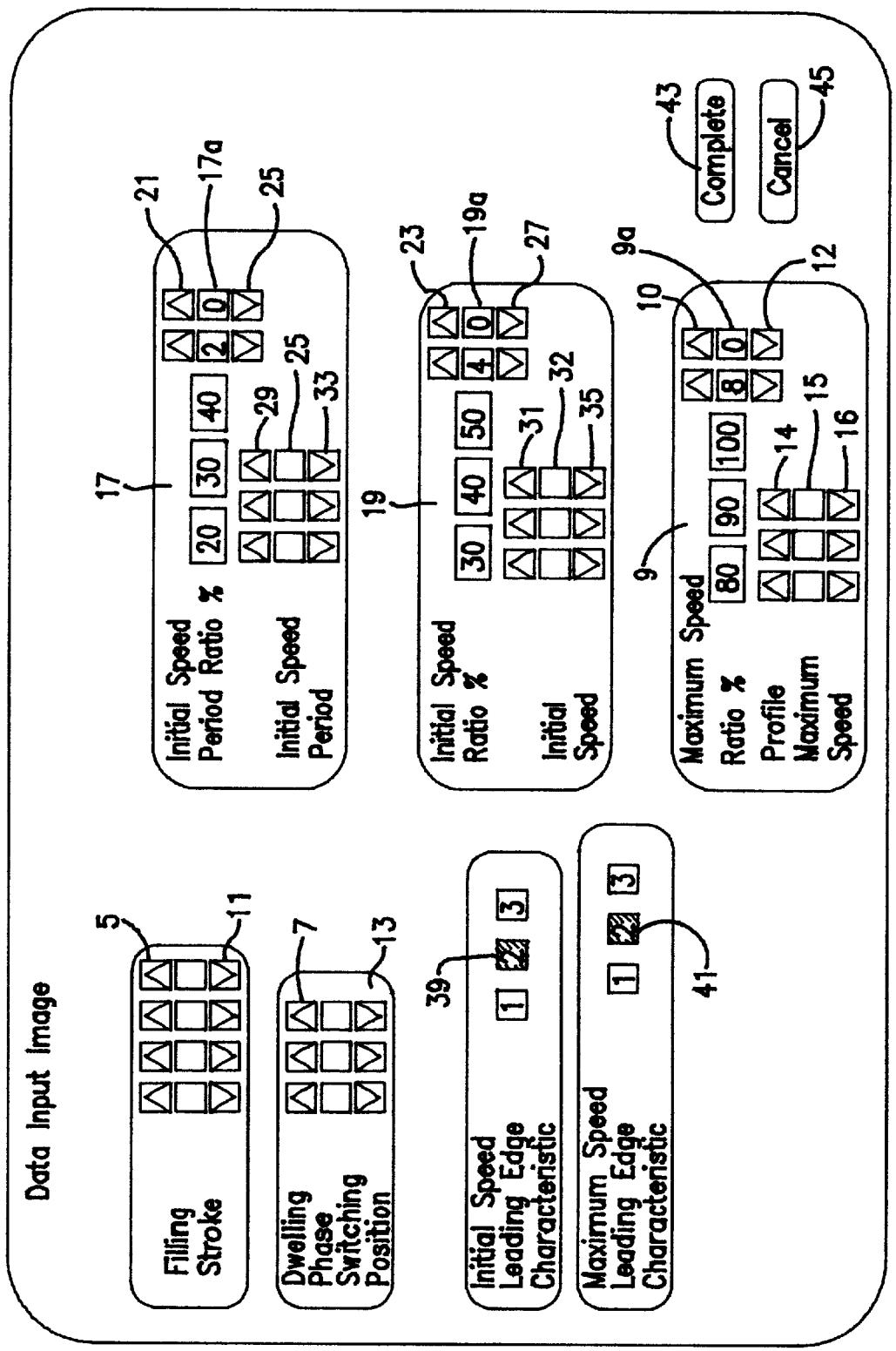
FIG. 3 is a schematic view depicting a construction of data inputting image surface of the apparatus for setting up a program profile in the control of the injection speed of injection molding machines according to the present invention.

The profile setting portion 1 outputs a command for displaying a data input image on the display 3 during a data input mode; and the data input image, for instance, shown in FIG. 3, is displayed on the image surface of the display 3 according to the command.

On the display 3, the items to be set up in the profile setting means are indicated as a list, on which are shown a filling stroke of the injection plunger, a dwelling phase switching position of the plunger when the injecting phase is changed from a material filling phase to a dwelling phase, a maximum speed ratio, and initial speed period ratio, and initial speed ratio, a characteristic of the leading edges of the initial speed, and a characteristic of the leading edge of the maximum speed; and push buttons are provided for each item for data setting purpose.

Windows for indicating the values of the filling stroke of the injection plunger and of the dwelling stage switching position of the injecting plunger, provide Up buttons 5 and 7 and down buttons 11 and 13, respectively. These buttons allow every digit of the displayed numbers to be selected.

The maximum speed ratio means a ratio of a maximum speed set up in the profile (hereinafter, called "profile maximum speed") to a maximum speed mentioned in the specification of the molding machine to be used (hereinafter, called as "machine maximum speed"). Concerning the maximum speed ratio, a plurality of values, for instance, 80%, 90% or 100%, are preliminarily given and these values are indicated on the display; and the windows 9 for indicating the ratios are used as push buttons for selecting one of the ratios. The selected ratio is displayed on the selection window 9a. Around the selection window 9a are provided up buttons 10 and down buttons 12 at each digit of the selected ratio in order to enable to make minor changes in the selected ratio.

One of the pre-set values of the maximum speed ratio is set as a default value; the default value is displayed on the selection window 9a. It should be noted the maximum speed ratio may be set up arbitrarily with the aid of up buttons 10 and the down buttons 12 instead of selecting one from the pre-set values.

The profile maximum speed, which is determined by the set-up maximum speed ratio, is further indicated on a selection window 15 by a real number. In this embodiment, around the window 15 for indicating the maximum speed, up buttons 14 and down buttons 16 are provided at every digit of the real number thereof for adjusting purpose. It is also possible to directly input the profile maximum speed in the profile setting means with the aid of the up buttons 14 an down buttons 16.

The initial speed period ratio means a ratio of the period, during which the initial speed of the plunger is kept, to the filling stroke of the injection plunger; a plurality of values, such as 20%, 30%, and 40%, are preliminarily set-up in the computer; windows 17 for indicating the pre-set values are used as push buttons for selecting one of the preset values. The selected ratio is displayed on the other window 17a, around which up button 21 and down button 25 are provided at every digit of the ratio.

While the initial speed ratio means a ratio of the initial speed of the plunger to the machine maximum speed; a plurality of values, such as 30%, 40% and 50%, are preliminarily prepared; window 19 for indicating the preset values are also used as push buttons for selecting one of the preset values. The selected ratio is displayed on the other selection window 19a, around which up button 23 and down button 27 are provided at every digit of the ratio.

Concerning the initial speed period ratio and the initial speed ratio, one of the pre-set values thereof are set-up default values, respectively; and the default values are displayed on the windows 17a and 19a, respectively. Should be noted that the initial speed period ratio and the initial speed ratio can be set up arbitrarily with the aid of up buttons 21, 23 and the down buttons 25 and 27, instead of selecting one from the pre-set values.

The initial speed period, which is determined by the set-up initial speed period ratio, is displayed on a window 30 by a real number. While the initial speed, which is determined by the set-up initial speed ratio, is displayed on a window 32 by a real number. In this embodiment, up buttons 29, 31 and down buttons 33, 36 are provided around the window 30 and 32, respectively, at every digit of the numbers thereof for adjusting purpose. It may be possible to directly input the initial speed period and the initial speed with the aid of up buttons 29, 31 and the down buttons 33 and 35.

Concerning the characteristics of the leading edge of the initial speed and the leading edge of the maximum speed, functions for determining the responding characteristics thereof are preliminarily prepared; the functions are displayed by code numbers, for instance 1, 2, and 3 on windows 39 and 41. The portions where the codes are displayed are also used as push buttons 39, 41 by which the code is selected and set up in the profile setting means. Linear functions, quadratic functions, a trigonometric functions, etc. may be preliminarily set up as the functions for determining the responding characteristics.

As to the characteristic of the leading edge of the initial speed and the characteristic of the leading edge of the maximum speed, the preliminarily set-up functions are used as default values, respectively; and codes corresponding to the default values are indicated on the windows 39 and 41 in a reversed manner.

The data input image surface of the display is arranged such that the values to be inputted are given to the profile setting portion 1 via the touch panel 2 by that an operator touches on the push buttons 5 to 41.

In the profile setting portion 1, the filling stroke of the plunger and the dwelling stage switching position of the plunger are directly set up so as to be the input values; the initial speed period is set up by automatically computing it using the input values of the filling stroke of the plunger and the initial speed period ratio as parameters; the profile maximum speed is set up by automatically computing it using the input value of the profile maximum speed ratio as a parameter; further, the profile initial speed is set up by automatically computing it using the input value of the initial speed ratio as a parameter.

The computed values, i.e. the initial speed period, the initial speed and the profile maximum speed, indicated on the display are real numbers. It should be noted that these set-up values can be adjusted with the aid of the up buttons 29, 31 and 14 and the down buttons 33, 35 and 16.

When the operator touches to a complete button 43, all of the setting of the profile is completed. While, when a cancel button 45 is touched, the image surface is turn to an initial image of the data inputting mode or to an initial menu image.

Figure 4:
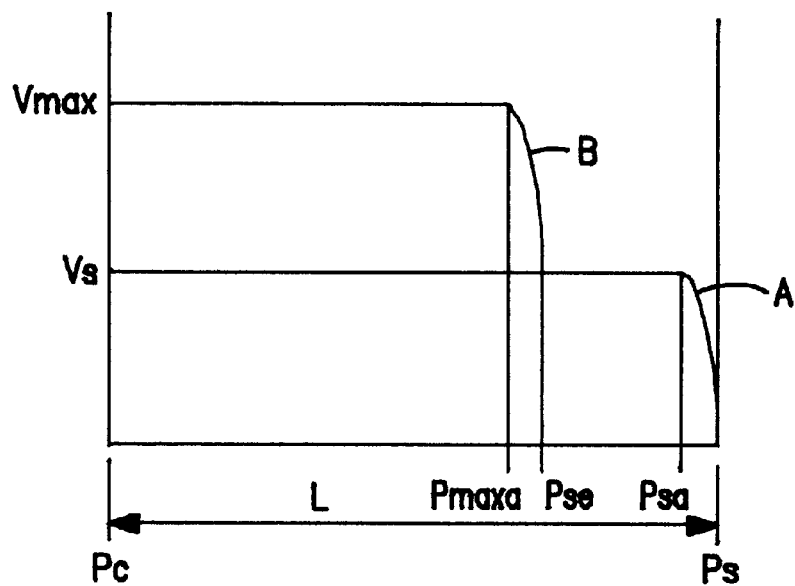
FIG. 4 is a schematic view illustrating an example of the profile which is set up by using the method according to the present invention.

FIG. 4 is a graph showing an example of a program profile set up by the apparatus for setting up a program profile in the control of an injecting speed of injection molding machines according to the present invention. In this example, when the filling stroke L of the plunger and the dwelling stage switching position Pc of the plunger are inputted, the injection starting position Ps of the plunger is determined by the formula of Pc+L. When the filling stroke L of the plunger, the dwelling stage switching position Pc and the initial speed period ratio Rps (%) are inputted, the position PSe, at which the initial speed period of the plunger ends, is determined by the formula of Pc+{L−((Rps/100) L)}. Further, the maximum speed ratio (%) Rvn and the initial speed ration (%) Rvs are inputted, the profile maximum speed Vmax can be obtained from the formula of (Rvm/100) Vm, and the initial speed Vs is determined from the formula of (Rvs/100) Vm, wherein the reference Vm represents the machine maximum speed.

When the functions for determining the characteristic of the leading edge of the initial speed and the characteristic of the leading edge of the maximum speed are designated, inclinations are given to the responding characteristics of the leading edge A of the initial speed and the leading edge B of the maximum speed, respectively, so that the position PSa, at which the moving speed of the plunger becomes to the given initial speed, and the position Pmax, at which the moving speed of the plunger becomes to the maximum speed, are automatically determined. Thereby, the program profile, as shown in FIG. 3, for controlling an injecting speed of injection molding machines is completed.

It should be noted that it is possible to determine that the functions for the characteristics of the leading edges of the initial speed and the leading edge of the maximum speed can be arbitrarily set up by the user.

In FIG. 4, a basic program profile is shown which is composed of a low speed period (the initial speed period), and a high speed period. During the initial speed period, melted resin is filled up in the spool and runner of a mold die; and during the high speed period the melt resin is filled up in the shape of the article mold cavity of the die. The injection speed in the high speed period is generally higher than that in the initial speed period. Some types of products can be molded according to such a program profile without any problem. However, when the injecting phase is changed from the material filling phase to the dwelling phase, the moving speed of the injection plunger in a forward direction should be generally reduced.

The reduction of the moving speed should be conducted generally, taking the shape of an article to be molded and the position of the gate of the mold die into consideration. However, the main purpose of the speed reduction is to absorb the inertia of the injecting plunger, which is moving to fill-up the material in the cavity, so that the switching movement of the plunger from the material filling phase to the dwelling phase is conducted in a stable manner. In this case, therefore, on the assumption of the ending speed Vf of the plunger, the moving speed of the plunger should be reduced from the profile maximum speed Vmax to the ending speed Vf with a predetermined speed reduction characteristic, so that the moving speed of the plunger becomes the ending speed Vf at the dwelling phase switching position of the plunger. In this case, the position Pmax e, where the maximum speed duration ends, ("the speed reduction starting position") is automatically determined by the functions for setting up the dwelling phase switching position Pc of the plunger, the ending speed Vf and the speed reduction characteristic of the plunger.

In case that the ending speed Vf of the plunger and the speed reduction characteristic are preliminarily set up in a fixed manner, or default values therefor are provided, the profile thereof can be obtained only by inputting data for the same items as shown in FIG. 2. It should be noted that the ending speed Vf of the plunger can be set up by designating it by a real number or a ratio.

In case it is required to designate the ending speed Vf of the plunger because of the complex shape of the article to be molded, a window for indicating the ending speed and push buttons for setting a value thereof should be added to the image surface of the display. Further, it may be possible to arrange such that the speed reduction characteristics is set up by selecting one of the preliminarily set up functions or by setting it arbitrarily by the user.

Figure 5:
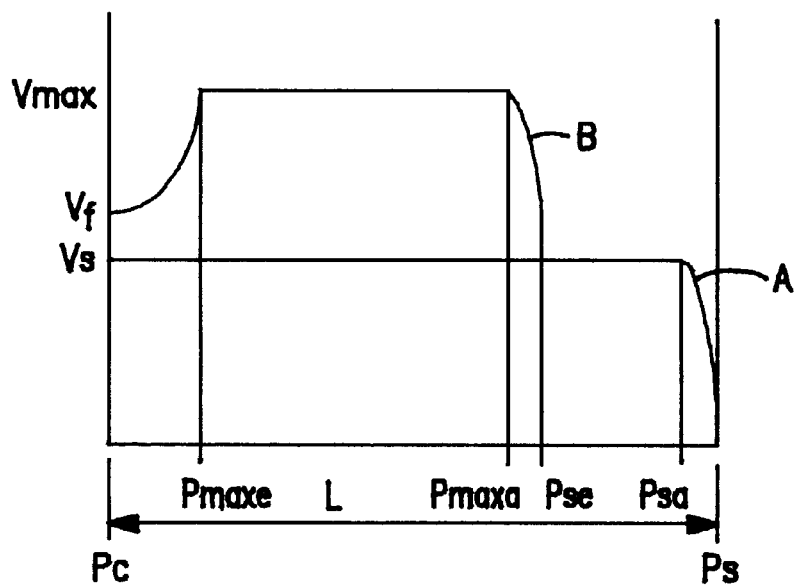
FIG. 5 is a schematic view presenting another example of the profile which is set up by using the method according to the present invention.

The profiles shown in FIGS. 4 and 5 can be applied to mold almost all types of products. The proper program profile in the control of the injection speed can be easily and automatically be set up only by inputting the filling stroke L of the plunger, the dwelling phase switching position Pc of the plunger, the profile maximum speed ratio Rvm, the initial speed period ratio Rs, the initial speed ratio Rvs, or by selecting one of the preliminarily set-up values thereof without requiring any know-how.

When the functions for determining the characteristics of the leading edge of the initial speed and the leading edge of the maximum speed are designated, respectively, inclinations are given to the responding speed characteristics of the leading edge A of the initial speed and the leading edge B of the maximum speed, respectively, in accordance with the thus designated functions, respectively. Therefore, a profile corresponding to the actual movement of the melt resin in the mold cavity can be obtained, and thus a closed loop control can be conducted in a suitable manner.

In case the shape of the article to be molded is complex, or the course of the resin in the mold die is complex, i.e. in a multiple cavity mold or in a multiple gate mold, it is required to set up the profile in much more detailed manner so as to comply with the complex shape of the article to be molded or the complex-shaped course of the resin. In such a case, the initial speed duration and the maximum speed period should be divided into a plurality of sub-periods so that the initial speed or the profile maximum speed of the plunger can be set up at every sub-period.

In the setting of such an initial speed or such a maximum speed of the plunger in a divided manner, it is arranged that once the first value (a set-up value for the first sub-period of the initial speed or the maximum speed) is set up, the subsequent values on and after the second one are provisionally set up so as to be the same as the first set-up initial value; the set-up values on and after the second sub-period can be arbitrarily increased or decreased as occasion demands. Thereby, in the case that a detail setting is not required or a detail setting is necessary because of the complex variation of the course of the melt resin, etc., the profile can easily or automatically be set up without increasing the user's action in operations.

In the profile shown in FIG. 6, the initial speed period is divided into two sub-periods. During the sub-period Psa-Psb, the initial speed Vs is kept constant; and during the sub-period Psb and Pse, the moving speed of the plunger is accelerated, so that the moving speed of the plunger $Vs+\alpha$ can be obtained at the end position Pse of the initial speed period. Further, the high speed period is divided into four sub-periods; during the sub-periods Pmax a to Pmax b and Pmax b to Pmax C, the profile maximum speed Vmax of the plunger is kept constant; while the moving speed of the plunger is reduced during the period Pmax c to Pmax d, so that the moving speed becomes $Vmax - \beta$ at an intermediate position Pmax d. Furthermore, during the sub-period Pmax d to Pmax e, the moving speed is accelerated again so that the moving speed becomes $(Vmax\ \beta)+\gamma$ at the position Pmax e, at which the maximum speed period ends.

In this case, the data $Vx+\alpha$, $Vmax-\beta$, $(Vmax-\beta)+\gamma$ should be additionally inputted into the profile setting means by a speed ratio or a real number.

It may be possible to determine the intermediate position Psb, and Pmax B to Pmax d with the same distances in a fixed manner, or to determine them in a variable manner by the user. Further, it is also possible to arrange such that a characteristic line of the profile is displayed and then the characteristic line can be arbitrarily designated on the display.

As explained above, the method and the apparatus for setting a program profile in the control of an injection speed of injection molding machines according to the present invention, a proper program profile in the control of an injection speed can be easily and automatically set up by only inputting the filling stroke of the plunger or an injection starting position of the plunger, a dwelling phase switching position of the injection plunger, a profile maximum speed or the profile maximum speed ratio, an initial speed or an initial speed ratio, and initial speed period ratio, or by selecting one of the preset values thereof.

Further, according to the present invention, since the profile is set-up in such a manner that the moving speed of the plunger is reduced from the maximum speed to the terminal speed with a given speed reduction characteristic so that the moving speed of the plunger becomes the given ending speed at the dwelling phase switching position, and therefore "burrs" are removed from the molded articles. Since the speed reduction characteristic can be set up by the preliminary given speed reduction functions, therefore, the required speed reduction characteristic can be easily obtained.

Furthermore, according to the method of the present invention, the moving speed of the plunger at the dwelling phase switching position (the ending speed of the plunger) can be directly inputted into the profile setting means via the data inputting means, suitable speed reduction control for each article to be molded can easily be set up.

According to the present invention, the values for the items, i.e. the profile maximum speed ration, the initial speed ratio, and the initial speed period ratio, can be set up by selecting ones from the preset values. Therefore, the setting can be effected very easily.

Further, according to the present invention, one of the preset values is set up as a default value, in order to prevent the possibility of forgetting to enter the set up value.

Furthermore, according to the present invention, the value set up by selecting one from the preset values for each item can be changed with the aid of the data inputting means, so that a user can arbitrarily set up a desired value using his own experience.

Moreover, according to the present invention, at least one of the initial speed period and the maximum speed period is divided into a plurality of sub-periods, and the initial speed or the maximum speed can be set up at every divided sub-period. Therefore, even if the course of the melted resin in the mold cavity is complex, the article can be molded without any problem. In the preferred embodiment of the present invention, once the first value (the value of the first sub-period) is set up, the values on and after the second one are provisionally set up to the same as the first value. Therefore, even in the case that detail setting is not necessary, the method and apparatus can be applied to the molding machine. While, in the other preferred embodiment, it is arranged such that the values on and after the second one can be arbitrarily increased or decreased as occasion demands, so that the method and apparatus can also be used to mold complex-shaped articles.

According to the present invention, the responding characteristics at least one of the leading edge of the initial speed of the leading edge of the maximum speed is (are) determined by a pre-set function(s). Therefore, a profile, which actually correspond to the movement of the melted resin in the mold cavity, can be obtained, and a closed loop control can be effected in a suitable manner.

According to the present invention, the function(s) to determine the responding characteristic(s) of at least one of the initial speed and the leading edge of the maximum speed can be set up by selecting one from the preset functions by using the data inputting means. Therefore, the functions can be automatically set up in an easy manner.

The present invention is not limited to the embodiments explained in detail above, and many alternatives are included in a range of the present invention.

What is claimed is:

1. A method for setting a program profile in the control of an injection speed of injection molding machines, in which a moving speed of an injection plunger in a forward direction such that the mold cavity will be filled is controlled by the program profile in accordance with a position of the plunger, comprising:

inputting into a profile setting means values for the following items:
a switching position of the infection plunger when an injecting phase is changed from a melt material filling phase to a dwelling phase;
one of a desired filling stroke for the injection phase and a starting position of the plunger for the injection phase;
a maximum speed of the profile;
an initial speed of the profile; and
a period during which said initial speed remains constant; and
automatically using the profile setting means to set up the program profile, wherein at least one responding speed characteristic of at least one of the leading edge of the initial speed and the leading edge of the maximum speed is determined by a predetermined function, and at least two functions for determining said at least one responding speed characteristic are preliminarily given in the profile setting means, and the responding speed characteristic is set up by the selection from the at least two functions with the aid of said data inputting means.

2. A method for setting a program profile in the control of an injection speed of injection molding machines, in which a moving speed of an injection plunger in a forward direction such that the mold cavity will be filled is controlled by the program profile in accordance with a position of the plunger, comprising:

inputting into a profile setting means values for the following items:
a switching position of the injection plunger when an injecting phase is changed from a melt material filling phase to a dwelling phase;
one of a desired filling stroke of the injection plunger for the injection phase and a starting position of the plunger for the injection phase;
a ratio of maximum speed of the profile to a maximum speed mentioned in a specification of the molding machine;
a ratio of an initial speed of the profile to the maximum speed mentioned in the specification of the molding machine; and
a ratio of an initial speed period during which the initial speed remains constant to one of the filling stroke of the injection plunger and the injection starting position;
directly setting up the dwelling phase switching position of the injection plunger and one of the filling stroke of the injection plunger and the injection starting position of the plunger by said profile setting means;

setting up said maximum speed of the profile, said initial speed of the profile and an initial speed period of the profile by an automatic calculation using the input values; and automatically using the profile setting means to set up the profile, wherein at least one responding speed characteristic of at least one of the leading edge of the initial speed and the leading edge of the maximum speed is determined by a predetermined function, and at least two functions for determining said at least one responding speed characteristic are preliminarily given in the profile setting means, and the responding speed characteristic is set up by the selection from the at least two functions with the aid of said data inputting means.

* * * * *